US011485505B2

United States Patent
Iliopoulos et al.

(10) Patent No.: US 11,485,505 B2
(45) Date of Patent: Nov. 1, 2022

(54) METHOD AND SYSTEM FOR ALIGNING PROPULSION SYSTEM AND VEHICLE HAVING SUCH PROPULSION ALIGNMENT

(71) Applicant: BOMBARDIER INC., Dorval (CA)

(72) Inventors: Alexandros Iliopoulos, Montreal (CA); Laurent Regnault, Montréal (CA); Marcin Kulczyk, Montreal (CA); Alain Richer, Mirabel (CA)

(73) Assignees: BOMBARDIER INC., Dorval (CA); AIRBUS CANADA LIMITED PARTNERSHIP, Mirabel (CA)

( * ) Notice: Subject to any disclaimer, the term of this patent is extended or adjusted under 35 U.S.C. 154(b) by 1136 days.

(21) Appl. No.: 15/576,996

(22) PCT Filed: May 27, 2016

(86) PCT No.: PCT/IB2016/053152
§ 371 (c)(1),
(2) Date: Nov. 27, 2017

(87) PCT Pub. No.: WO2016/193890
PCT Pub. Date: Dec. 8, 2016

(65) Prior Publication Data
US 2018/0162540 A1 Jun. 14, 2018

Related U.S. Application Data

(60) Provisional application No. 62/168,342, filed on May 29, 2015.

(51) Int. Cl.
*B64D 27/18* (2006.01)
*B64F 5/10* (2017.01)
(Continued)

(52) U.S. Cl.
CPC .............. *B64D 27/18* (2013.01); *B64C 15/02* (2013.01); *B64F 5/10* (2017.01); *G01M 1/125* (2013.01)

(58) Field of Classification Search
CPC ........ B64D 27/00; B64D 27/06; B64D 27/16; B64D 27/18; B64D 27/20; B64F 5/10; B64C 15/02; G01M 1/125
See application file for complete search history.

(56) References Cited

U.S. PATENT DOCUMENTS 3,480,236 A 11/1969 Nash
3,666,211 A * 5/1972 Cathers .................. B64D 27/20
244/54
(Continued)

FOREIGN PATENT DOCUMENTS

WO 2013032490 A1 3/2013

OTHER PUBLICATIONS

PCT international Search Report and Written Opinion dated Aug. 4, 2016 re: International Application No. PCT/IB2016/053152.

*Primary Examiner* — Benjamin P Lee
(74) *Attorney, Agent, or Firm* — Norton Rose Fulbright Canada LLP

(57) ABSTRACT

An aircraft (10) is described as including a reference axis extending along at least a portion of the aircraft, and a propulsion system having a thrust vector feature (43) defining generally a direction of thrust of the turbofan engine (18), the thrust vector feature (43) extending relative to a thrust vector axis, where the turbofan engine (18) is disposed on the aircraft with the thrust vector feature (43) oriented with respect to the reference axis of the aircraft.

9 Claims, 7 Drawing Sheets

(51) Int. Cl.
*B64C 15/02* (2006.01)
*G01M 1/12* (2006.01)

(56) References Cited

U.S. PATENT DOCUMENTS

| | | | | |
|---|---|---|---|---|
| 7,165,744 | B2 | 1/2007 | Howarth et al. | |
| 7,869,895 | B2* | 1/2011 | Jones | B64F 5/10 |
| | | | | 700/114 |
| 7,967,243 | B2 | 6/2011 | Verde Preckler et al. | |
| 8,157,207 | B2 | 4/2012 | Mengle et al. | |
| 8,322,655 | B1 | 12/2012 | Kismarton et al. | |
| 2009/0112349 | A1* | 4/2009 | Cobb | B64F 5/10 |
| | | | | 700/114 |
| 2009/0151143 | A1* | 6/2009 | Jones | B64F 5/10 |
| | | | | 29/407.1 |
| 2010/0212288 | A1 | 8/2010 | Suchezky et al. | |
| 2019/0016471 | A1* | 1/2019 | Lieser | F02K 3/06 |

\* cited by examiner

METHOD AND SYSTEM FOR ALIGNING PROPULSION SYSTEM AND VEHICLE HAVING SUCH PROPULSION ALIGNMENT

CROSS-REFERENCE TO RELATED APPLICATIONS

This present application is a national phase application under 35 U.S.C. 371 of International Patent Application No. PCT/IB2016/053152 filed on May 27, 2016, which claims priority from U.S. Provisional Patent Application No. 62/168,342 filed on May 29, 2015, the contents of which are hereby incorporated by reference.

TECHNICAL FIELD

The invention relates to vehicles and, more particularly, to a method and system for aligning a propulsion system on an aerospace vehicle with respect to a direction of thrust, and an aerospace vehicle having such aligned propulsion system.

BACKGROUND

A force propulsion mechanism is typically designed and assembled onto a vehicle based upon alignment of a centerline of the mechanism with respect to a reference axis of the vehicle. For example, a civilian commercial aircraft typically includes turbofan engines disposed within a nacelle housing, mounted upon a pylon under wing or at another location on the aircraft. The turbofan engine includes a nose cone at a forward location and a tail cone at a rearward location. Traditionally, an engine centerline axis is calculated as extending from a centrally positioned point on the nose cone through a centrally positioned point on the tail cone. This centerline axis is then used to design the mounting orientation of the engine upon the aircraft. That is, in the design phase, the location and orientation of the turbofan engine on the aircraft is determined by utilizing the engine centerline with reference to a symmetry axis of the aircraft such as a top level aircraft axis. After the turbofan engine is assembled and mounted on the aircraft, engine symmetry is measured exclusively with respect to the engine centerline axis.

However, the engine centerline axis does not always align with the thrust vector axis of the respective engine, i.e., an axis which extends longitudinally through the majority of thrust emitted from the engine. In fact, often the engine centerline axis and the thrust vector axis do not coincide and are instead divergent. As a result, engine thrust is not properly aligned with its designed direction with respect to the aircraft. This misalignment leads to a drag penalty that impacts, among other things, the high-speed performance of the aircraft. Furthermore, directional thrust misalignment can result in unintended and unexpected increases in fuel consumption, thus contributing to an overall reduction in aircraft efficiency. These disadvantages are particularly evident with high bypass ratio turbofan engines in which a majority of thrust is provided from the bypass core as compared with thrust provided directly from the engine via the tail cone. The significant thrust emitted from the bypass core is often not aligned with the engine centerline axis. Thus, relying on the centerline axis as the only parameter for establishing engine position on the aircraft results in inevitable misalignment and hence contributes to performance reductions.

Thus, a method and a system is required which reduce misalignment between engine thrust and the desired aircraft direction of travel, while reducing the time, costs, and complexity of completing engine symmetry checks.

BRIEF SUMMARY

An aircraft is described as including a reference axis extending along at least a portion of the aircraft, and a propulsion system having a thrust vector defining a direction of thrust of the propulsion system, the thrust vector being associated with a thrust vector feature, where the turbofan engine is disposed on the aircraft with the thrust vector feature oriented with respect to the axis of the aircraft.

In some embodiments, the thrust vector feature is a thrust vector axis. In some embodiments, the thrust vector feature is an exit plane of the propulsion system.

In some embodiments, the propulsion system comprises a turbofan engine having an exit plane at a rearward end of the engine, wherein the thrust vector feature is defined as an axis perpendicular to the exit plane.

In some embodiments, the aircraft further comprises a nacelle disposed at least partially over the turbofan engine, where the engine fan exit plane is delimited by a rearward terminal end of the nacelle.

In some embodiments, the exit plane comprises a plane formed by at least three points at the rearward terminal end of the nacelle. In some embodiments, the exit plane comprises a least square plane formed by a plurality of points disposed at the rearward terminal end of the nacelle. In some embodiments, the nacelle comprises a first cowl and a second cowl, the first cowl having a plurality of points on a rearward terminal surface thereof, the second cowl having a plurality of points on a rearward terminal surface thereof, wherein the engine fan exit plane comprises a least square plane delimited by the plurality of points on the first cowl and the plurality of points on the second cowl.

In some embodiments, the plurality of points on the first cowl comprises at least five equally spaced points. In some embodiments, the plurality of points on the second cowl comprises at least five equally spaced points.

In some embodiments, the reference axis comprises an axis extending generally longitudinally through a fuselage of the aircraft.

In some embodiments, the reference axis comprises a wing symmetry axis which extends relative to a wing of the aircraft.

In some embodiments, the propulsion system comprises a turbofan engine having a nose cone at a forward end, a tail cone at a rearward end, and a centerline axis extending from a point on the nose cone to a point on the tail cone, wherein the thrust vector feature diverges from the centerline axis.

In some embodiments, the thrust vector feature comprises a primary direction of thrust emitted by the turbofan engine.

Also described herein is a method of establishing good alignment of a propulsion system on an aircraft, the method including determining a reference axis of the aircraft, determining a thrust vector feature of the turbofan engine, and aligning the turbofan engine horizontally and/or vertically with respect to the aircraft by arranging the thrust vector feature relative to the reference axis of the aircraft.

In some embodiments, determining the reference axis of the aircraft comprises identifying an axis extending generally longitudinally through a fuselage of the aircraft.

In some embodiments, determining the reference axis of the aircraft comprises identifying a wing symmetry axis which extends relative to a wing of the aircraft.

In some embodiments, determining the thrust vector feature comprises delimiting an exit plane at a rearward end of the propulsion system and defining the thrust vector feature as an axis perpendicular to the exit plane.

In some embodiments, the propulsion system is a turbofan engine, and wherein delimiting said exit plane further comprises assigning at least three points at a rearward terminal end of a nacelle extending over the turbofan engine, and extending a plane between said points.

In some embodiments, delimiting said exit plane further comprises identifying a first plurality of points on a rearward terminal surface of a first cowl of the nacelle and identifying a second plurality of points on a rearward terminal surface of a second cowl of the nacelle and identifying a least square plane delimited by the first and second plurality of points.

In some embodiments, aligning the propulsion system horizontally and/or vertically with respect to the aircraft comprises projecting an axis perpendicular to the thrust vector feature onto the reference axis and orienting the projected axis with respect to the reference axis.

In some embodiments, the propulsion system is a turbofan engine, and wherein the axis perpendicular to the thrust vector feature is disposed in an a least square plane formed by a plurality of points located at a rearward terminal edge of a nacelle disposed over the turbofan engine.

In some embodiments, the method further comprises confirming alignment of the propulsion system including:
measuring a plurality of points at a rearward terminal end of the propulsion system,
establishing a least square plane defined by said points, projecting the plane to the reference axis, and
comparing the orientation of the exit plane projection with the reference axis.

In some embodiments, the method further comprises calculating a possible variation of the thrust vector relative to the reference axis of the aircraft due to a variation of various aircraft components; and adapting the design to account for such variations.

In some embodiments, determining the thrust vector feature comprises determining a thrust vector axis.

In some embodiments, determining the thrust vector feature comprises determining an exit plane of the propulsion system.

BRIEF DESCRIPTION OF THE DRAWINGS

The various embodiments of the present disclosure can be understood with reference to the following drawings. The components are not necessarily to scale. Also, in the drawings, like reference numerals designate corresponding parts throughout the several views.

DETAILED DESCRIPTION

The present disclosure is more particularly described in the following description and examples that are intended to be illustrative only since numerous modifications and variations therein will be apparent to those skilled in the art. As used in the specification and in the claims, the singular form "a," "an," and "the" may include plural referents unless the context clearly dictates otherwise. Also, as used in the specification and in the claims, the term "comprising" may include the embodiments "consisting of" and "consisting essentially of." Furthermore, all ranges disclosed herein are inclusive of the endpoints and are independently combinable.

As used herein, approximating language may be applied to modify any quantitative representation that may vary without resulting in a change in the basic function to which it is related. Accordingly, a value modified by a term or terms, such as "about" and "substantially," may not to be limited to the precise value specified, in some cases. In at least some instances, the approximating language may correspond to the precision of calculating and/or storing the value.

Figure 1:
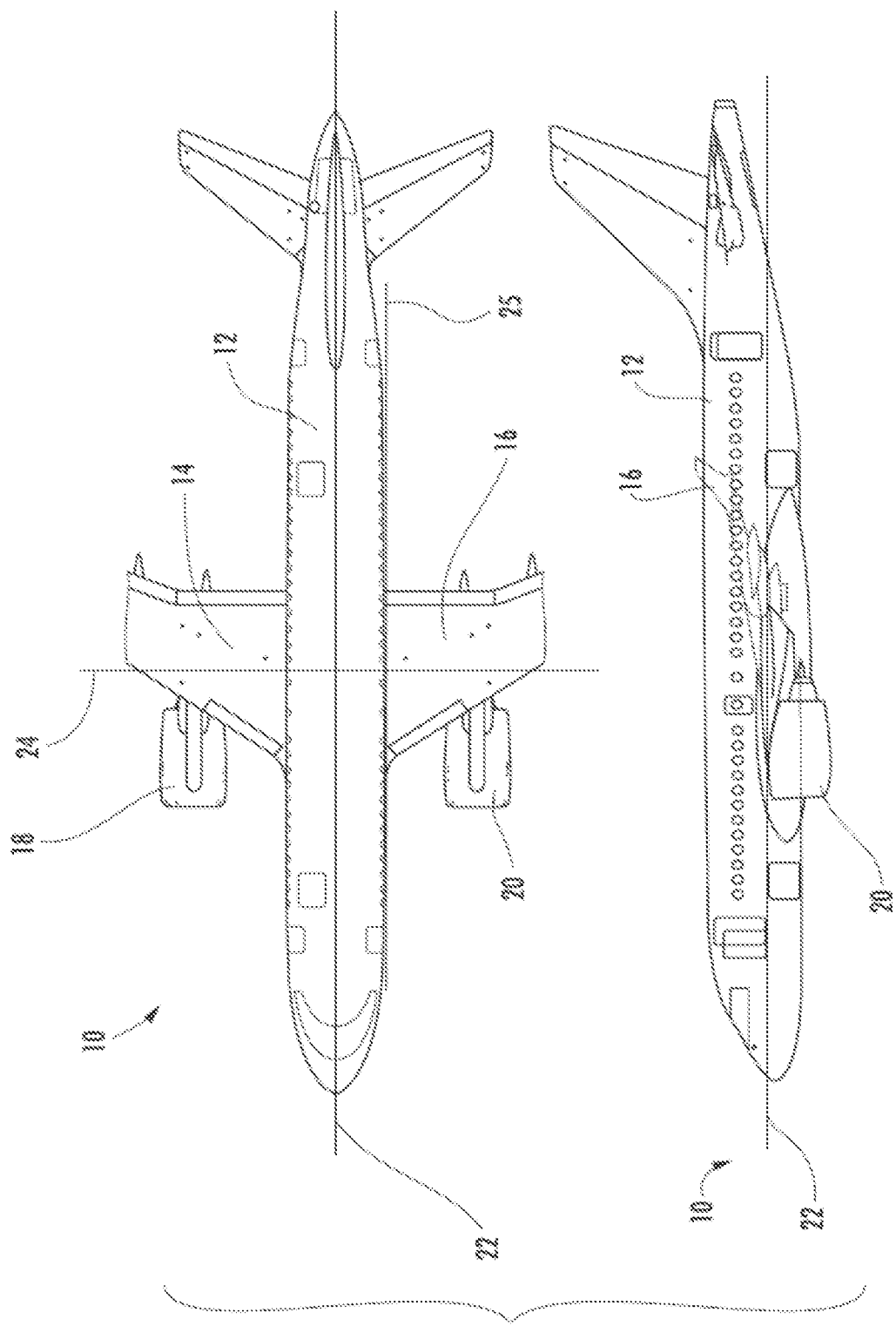
FIG. 1 shows an aircraft in one embodiment of the disclosure.

FIG. 1 shows a civilian commercial jetliner 10 including a fuselage 12 having a right wing 14 and a left wing 16 with a right engine 18 disposed beneath the right wing 14 and a left engine 20 disposed beneath the left wing 16. In this illustrative example, the engines 18, 20 are high bypass turbofan engines. The aircraft 10 is assigned a centerline reference axis 22, which extends through the fuselage 12, and an orthogonal reference axis 24, which extends perpendicular to the centerline reference axis 22. The aircraft 10 further includes a datum MC axis 25 which extends along a side of the aircraft 10.

Figure 2:
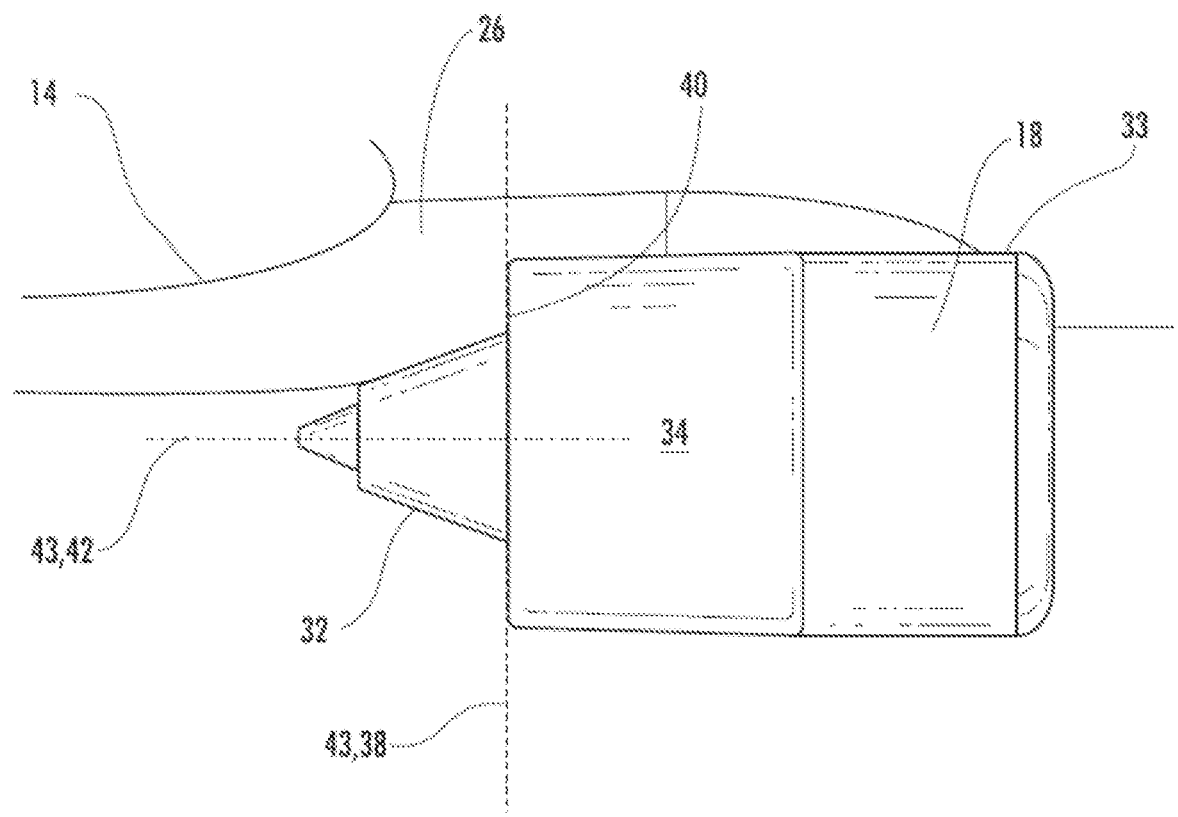
FIG. 2 illustrates a turbofan engine of the aircraft of FIG. 1.
Figure 3:
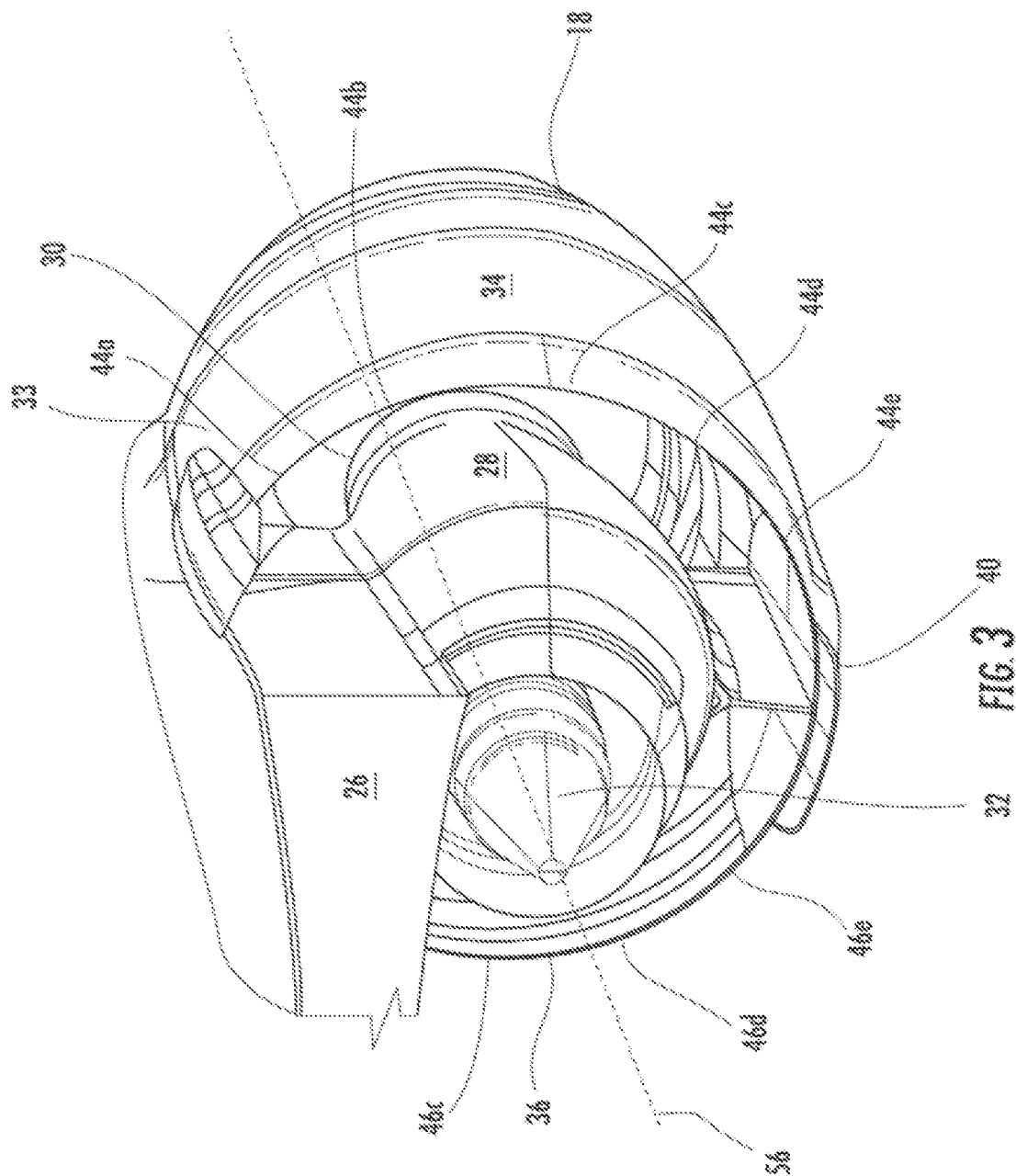
FIG. 3 is a rear perspective view of the engine of FIG. 1.

FIGS. 2 and 3 provide enlarged, partial views of the aircraft of FIG. 1, specifically showing the right turbofan engine 18 mounted on a pylon 26 beneath the right wing 14. The engine 18 comprises an engine core 28 having a nose cone 30 disposed at a forward end of the engine 18 and a tail cone 32 arranged at a rearward, aft end of the engine 18. A nacelle 33 surrounds the engine core 28 and, in this example, includes opposing cowls 34 and 36 arranged in a clamshell fashion about the engine core 28. Such a clamshell arrangement may consist of a hinged coupling between the cowls 34, 36 and the pylon 26 with a mechanical connection between the cowls 34, 36 at an end opposite from the pylon 26. This construction is of course exemplary and may vary as desired within the broad scope of the invention. For example, a single cowl may form the nacelle 33, or more than two cowls can be used to construct the nacelle 33. However, for illustrative purposes, the nacelle 33 will herein be described as comprising two cowls 34 and 36.

The turbofan engine 18 includes an exit plane 38 located at the rearward aft end. More particularly, the exit plane 38 is delimited by a rearward edge 40 of the nacelle cowls 34, 36. An engine thrust vector feature 43 may be defined in relation to the exit plane 38.

The thrust vector feature 43, in one exemplary embodiment, is a reference axis 42 which is defined as an axis extending substantially perpendicularly and generally centrally from the exit plane 38 of the turbofan engine 18. This reference axis 42 may be collinear with an actual thrust vector axis of the engine 18 or it may extend at an angle thereto. The thrust vector axis is an axis which extends rearward of the engine 18, longitudinally through the majority of thrust emitted by the engine 18.

In another embodiment, the thrust vector feature 43 may comprise the exit plane 38. More generally, the thrust vector feature may be any geometric element associated with the propulsion force emitted by the engine and which is used to orient the engine relative to the rest of the aircraft.

The exit plane 38 is established by identifying a plurality of points 44, 46 located at the rearward edge 40 of the nacelle cowls 34, 36. For example, and as best shown in FIG. 3, points 44a, 44b, 44c, 44d, and 44e are located on the cowl 34 while points 46a, 46b, 46c, 46d, and 46e are found on the cowl 36. In the illustrated example, points 44a, 44b, 44c, 44d, and 44e are equally spaced with respect to each other. Similarly, points 46a, 46b, 46c, 46d, and 46e are equally spaced along the cowl 36. The exit plane 38 is defined as the least square plane extending amongst the points 44 and 46. Here, the thrust vector feature 43 is defined as a reference axis 42 (which could be a thrust vector axis) extending perpendicular to this least square plane 38. The selected points 44, 46 are of course merely exemplary, any plurality of points at the rear of the engines 18, 20 may be used to determine the exit plane 38, and such points may be equally or unequally spaced. The points 46, 48 used to establish the exit plane 38 can be calculated by any sufficient means and by use of any sufficient mechanism. In one example, a laser tracker is used to locate various points at the rear of the nacelle cowls. Here, the laser tracker is brought into contact with the cowls at specific locations and computer software and a server locate the points in a three dimensional coordinate reference system and determine the plane extending there between. Then this system establishes the thrust vector feature 43 and is configured to compare the same to the symmetry axes of the aircraft.

Figure 4:
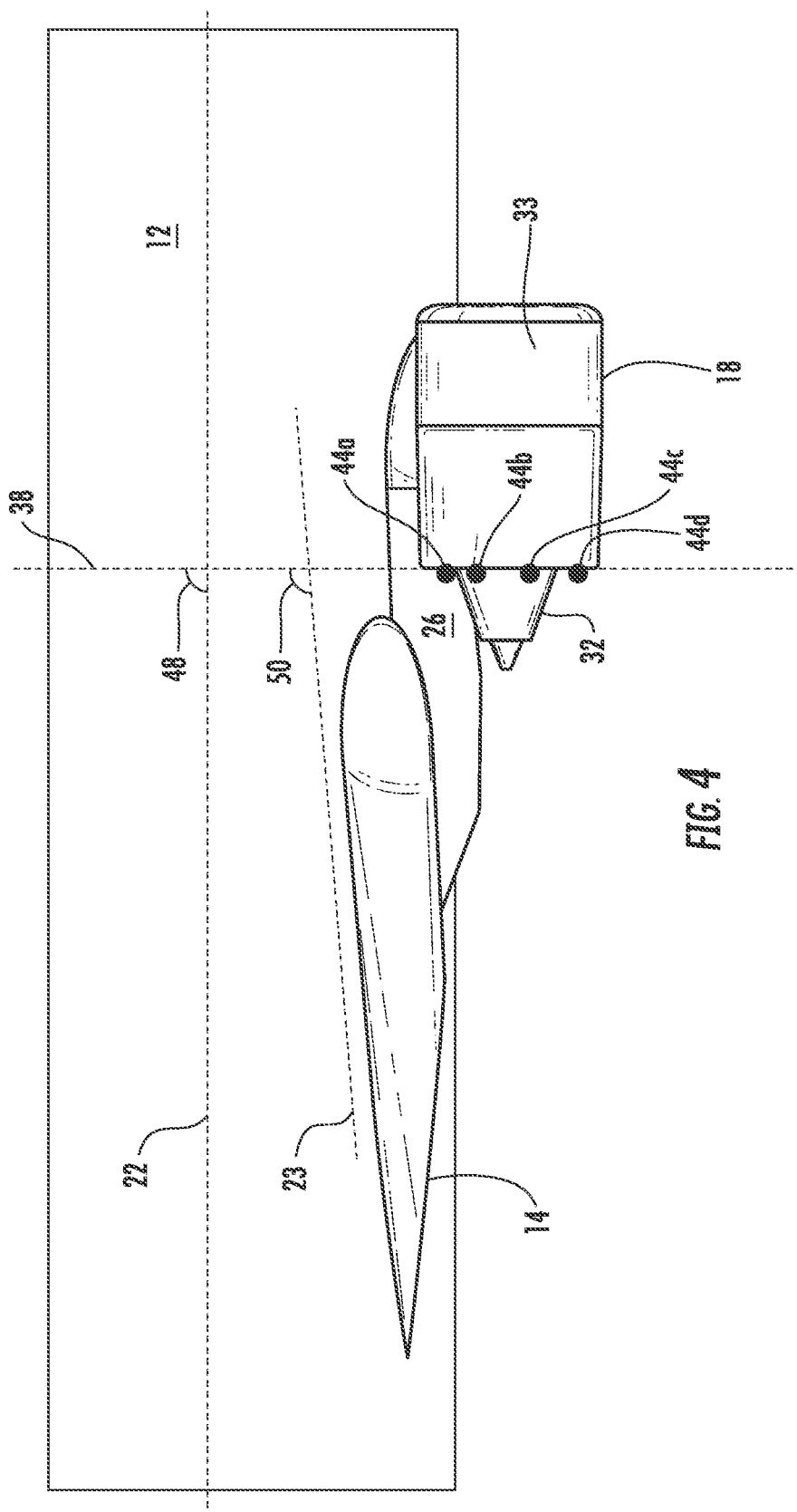
FIG. 4 is a partial side view of the aircraft of FIG. 1.
Figure 5:
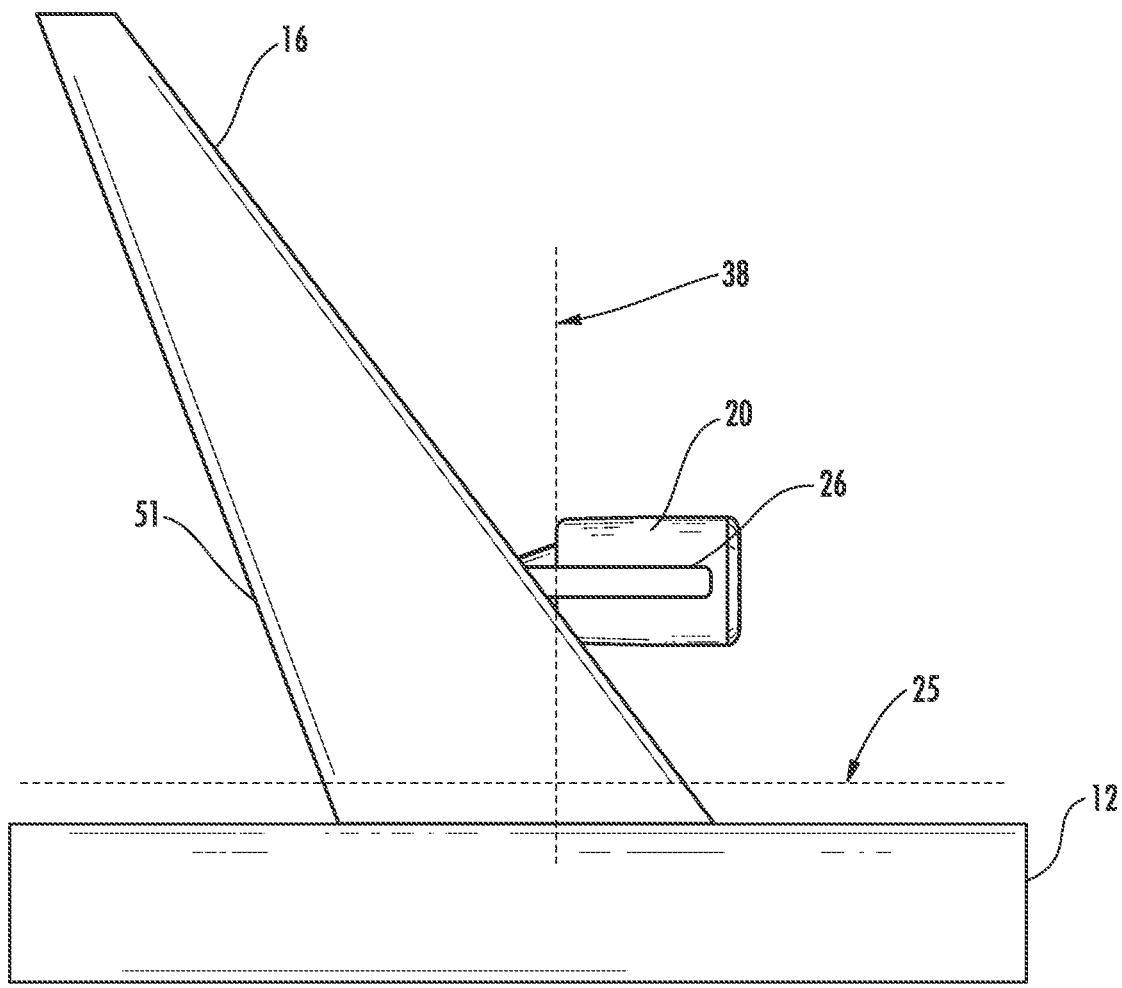
FIG. 5 is a partial top view of the aircraft of FIG. 1.

During the design phase of the aircraft 10, the thrust vector feature 43 is related to one or more of the various aircraft reference axes in order to determine position and orientation and possible variation of the engines 18, 20. For example, as shown in FIG. 4, the exit plane 38 can be projected onto the aircraft centerline axis 22 and/or onto a wing symmetry axis 23. The angles 48 and 50 which extend, respectively, between the projected exit plane 38 and the centerline axis 22 and between the exit plane 38 and the wing symmetry axis 23 are calculated and used for determining a desired vertical position and orientation of the particular engine. Similarly, as shown in FIG. 5, the exit plane 38 is projected on the datum MC reference axis 25 and the angle 51 therebetween is used to determine a desired horizontal positioning of the engine, i.e., left-right. Subsequently, these angles are measured after the aircraft is built to confirm the true position of the thrust vector feature 43.

Thus, the aircraft 10 is designed and assembled with the turbofan engines 18, 20 mounted upon the wings 14, 16 such that the thrust vector feature 43 of each engine is positioned with respect to the relevant aircraft axes in order to achieve desired drag and fuel efficiency characteristics. The thrust vector feature 43 can coincide with and be aligned with an engine centerline axis 56 which, as seen in FIG. 3, extends through the engine core 28 from a point on the nose cone 28 to a point on the tail cone 30. However, more typically, due to component variation during build, the thrust vector feature 43 extends independently of and diverges from the engine centerline axis 56. Also, as mentioned previously, the thrust vector feature 43 can coincide with or diverge from the actual thrust vector axis of the engine, i.e., the axis of the majority of thrust emitted by the engine.

Figure 6:
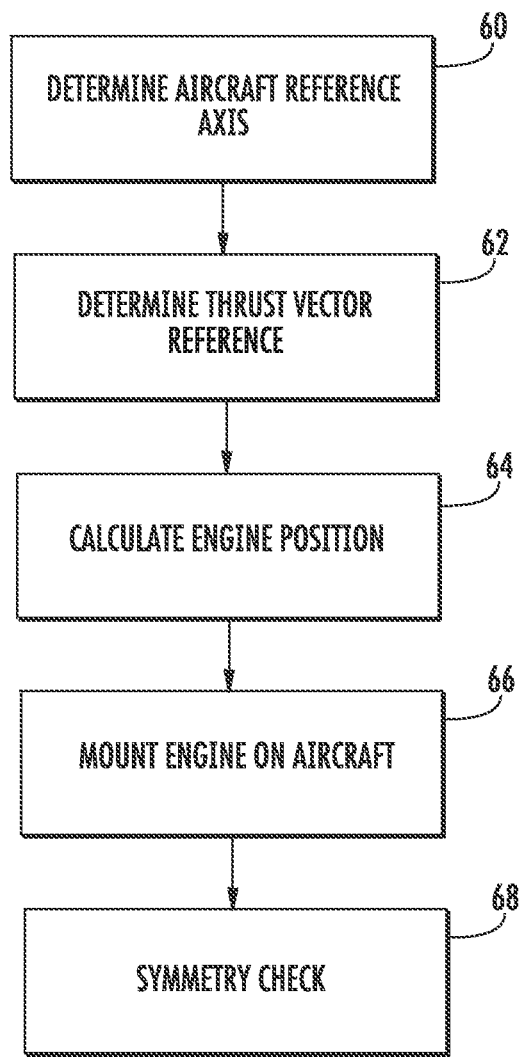
FIG. 6 is a flow diagram showing a method of aligning and mounting an engine on an aircraft.

FIG. 6 illustrates an exemplary method of determining position and alignment of a high bypass turbofan engine on an aircraft. At a first step 60, a reference axis is determined for the aircraft. As discussed with respect to FIG. 1, such reference axis may comprise a centerline axis measured through the fuselage, from a point at the front of the aircraft to a point at the rear. Additionally and/or alternatively, such reference axis may extend orthogonally with respect to the longitudinal axis of the fuselage (see element 24 in FIG. 1) or may be established as a datum MC axis 25, as seen in FIGS. 1 and 5. Other aircraft reference axes may also be used without departing from the present invention.

Step 62 in FIG. 6 concerns the establishment of a thrust vector feature 43 with respect to the turbofan engine. One method of determining such thrust vector feature 43 comprises determining an exit plane of the engine. This exit plane may act as thrust vector feature 43, or alternatively, the thrust vector feature 43 may be calculated to be an axis generally perpendicular to the exit plane.

The thrust vector feature 43 is understood generally to be any geometric feature from which an actual thrust direction of the engine can be determined. Thus, in an alternate embodiment, step 62 involves merely calculating the exit plane and using that as the thrust vector feature.

Step 64 of FIG. 6 involves determining the positioning and orientation of the engine based upon the relationship of the aircraft reference axis and the thrust vector feature 43. Step 64 typically happens during the design phase of an aircraft. Here, the thrust vector feature may be considered and manipulated with direct reference to the aircraft axis. That is, the axis perpendicular to the exit plane may be aligned with or may be arranged diverging from the selected aircraft axis. Alternatively, the exit plane can be projected on to the reference axis. Then the angle between the two axes can be measured and adjusted as necessary to bring the turbofan engines 18, 20 into a desired mounted position. A design that will allow such an adjustment to occur during the engine installation is useful for optimum results but is not necessary for this process to work. At step 66 the engine is mounted upon the aircraft based upon the location information generated in steps 60-64. Optionally, a symmetry check is conducted at step 68 after assembly of the aircraft is completed. Here, symmetry of the engines is determined by comparing the thrust vector feature, i.e., the axis perpendicular to the exit plane and/or the projection of the exit plane, with respect to one or more of the reference engine axes. A similar symmetry check can be conducted after a triggering event, such as a hard landing.

Figure 7:
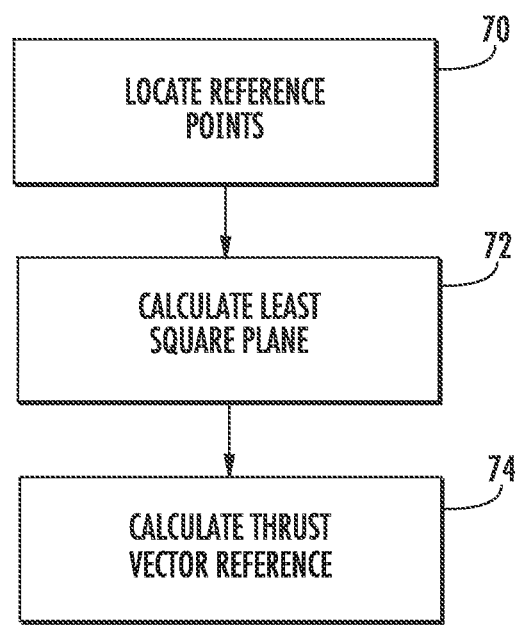
FIG. 7 is a flow diagram showing an exemplary for method determining a thrust vector of a turbofan engine.

FIG. 7 provides one exemplary method for determining the exit plane of the turbofan engine. At step 70, this is accomplished by identifying a plurality of points at the rear of the engine and using these points to delimit a plane. More specifically, a plurality of equally spaced points, for example 10 points, are located at the rearward terminal edge of cowls of a nacelle which surrounds the core of the turbo fan engine. Then, at step 72, the least square plane is calculated amongst the identified points. Finally, at step 74, the thrust vector feature is calculated, which may be as extending perpendicularly to and rearward from the exit plane. Alternatively, as discussed above, the thrust vector feature is defined as the exit plane itself, or as any geometric feature that is representative of a thrust direction of the engine. The plurality of points used to establish the exit plane may be determined by any suitable means and/or mechanisms. For example, a laser tracker may be brought into contact with the nacelle cowls at specific locations and certain software and servers are then utilized to establish these points in a coordinate reference system and to calculate the plane extending there between.

The aircraft, method, and system described herein provide for determination of the thrust vector feature of a turbofan engine and the mounting of such engine upon an aircraft based upon this thrust vector feature, without strictly relying on the centerline of the engine mounting. As a result, the engine is arranged on the aircraft so as to generally align engine thrust with its designed position in relation to one or more aircraft reference axes, thus increasing fuel efficiency and overall performance.

Herein, the turbofan engines 18, 20 of the aircraft 10 are described as being disposed beneath the respective wings 14, 16. However, this is merely exemplary. The turbofan engines may be disposed elsewhere on the aircraft, for example on the fuselage or at the tail of the aircraft. Similarly, two engines 18, 20 are discussed herein, but of course the broad scope of the invention covers a single turbofan engine and more than two of such engines. Moreover, while the above disclosure describes the engines 18, 20 as being high bypass turbofan engines, in another embodiment they may be low bypass turbofan engines or any other suitable propulsion mechanism sufficient for directing movement of the aircraft.

Herein, in one exemplary embodiment, the thrust vector feature is determined by establishing an axis perpendicular to an exit plane of the turbofan engines 18, 20. This is merely illustrative, and the thrust vector feature may be defined as an axis which is at an angle to the exit plane of less than or greater than ninety degrees. Alternatively, the thrust vector feature maybe calculated by any other method sufficient for determining the primary direction of thrust produced by a particular engine. It is this primary direction of thrust, or a component thereof, which is used to align the engine upon the aircraft. Still further alternatively, the exit plane itself may be used as the thrust vector feature and a projection thereof can be used to calculate orientation of the engine relative the aircraft axis.

Herein, the invention is described by way of example with reference to an aircraft having a propulsion system. However, the invention extends to any propelled vehicle. For example, a water vehicle such as a boat or jet ski may include a propulsion system where water is propelled through an exit plane. Here, the propulsion system can be disposed on the water vehicle by orienting the exit plane with respect to an axis of the water vehicle in a similar manner as discussed above.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is also intended to cover and embrace all suitable changes in technology. Modifications which fall within the scope of the present invention will be apparent to those skilled in the art, in light of a review of this disclosure, and such modifications are intended to fall within the appended claims.

What is claimed:

1. A method of establishing and varying alignment of a propulsion system on an aircraft, the propulsion system comprising a turbofan engine, the method comprising:
    determining a reference axis of the aircraft by identifying an axis extending generally longitudinally through a fuselage of the aircraft;
    determining a thrust vector feature of the propulsion system by delimiting an exit plane at a rearward end of the turbofan engine, and defining the thrust vector feature as an axis perpendicular to the exit plane; and
    aligning the propulsion system horizontally and/or vertically with respect to the aircraft based on a relationship between the thrust vector feature and the reference axis of the aircraft.

2. The method of claim 1, wherein said determining the reference axis of the aircraft comprises identifying a wing symmetry axis which extends relative to a wing of the aircraft.

3. The method of claim 1, wherein delimiting said exit plane further comprises assigning at least three points at a rearward terminal end of a nacelle extending over the turbofan engine, and extending a plane between said points.

4. The method of claim 3, wherein delimiting said exit plane further comprises identifying a first plurality of points on a rearward terminal surface of a first cowl of the nacelle and identifying a second plurality of points on a rearward terminal surface of a second cowl of the nacelle and identifying a least square plane delimited by the first and second plurality of points.

5. The method of claim 1, wherein said aligning the propulsion system horizontally and/or vertically with respect to the aircraft comprises projecting an axis perpendicular to the thrust vector feature onto the reference axis and orienting the projected axis with respect to the reference axis.

6. The method of claim 5, wherein the axis perpendicular to the thrust vector feature is disposed in a least square plane formed by a plurality of points located at a rearward terminal edge of a nacelle disposed over the turbofan engine.

7. The method of claim 1, further comprising confirming alignment of the propulsion system including:
    measuring a plurality of points at a rearward terminal end of the propulsion system,
    establishing a least square plane defined by said points,
    projecting the exit plane to the reference axis, and
    comparing an orientation of the exit plane projection with the reference axis.

8. The method of claim 1, further comprising:
    calculating a possible variation of the thrust vector relative to the reference axis of the aircraft due to a variation of various aircraft components; and
    adapting a design of the aircraft to account for such variations.

9. A method of establishing and varying alignment of a propulsion system on an aircraft, comprising:
    determining a reference axis of the aircraft;
    determining a thrust vector feature of the propulsion system; and
    aligning the propulsion system horizontally and/or vertically with respect to the aircraft by arranging the thrust vector feature relative to the reference axis of the aircraft;
    wherein:
        said determining the thrust vector feature comprises delimiting an exit plane at a rearward end of the propulsion system and defining the thrust vector feature as an axis perpendicular to the exit plane;
        the propulsion system is a turbofan engine;
        delimiting said exit plane further comprises assigning at least three points at a rearward terminal end of a nacelle extending over the turbofan engine, and extending a plane between said points; and
        delimiting said exit plane further comprises identifying a first plurality of points on a rearward terminal surface of a first cowl of the nacelle and identifying a second plurality of points on a rearward terminal surface of a second cowl of the nacelle and identifying a least square plane delimited by the first and second plurality of points.

* * * * *